United States Patent
Daios

(10) Patent No.: US 10,736,278 B2
(45) Date of Patent: Aug. 11, 2020

(54) ANTI-CLOGGING DRIP IRRIGATION EMITTER

(71) Applicant: Dimitrios Daios, Naoussa (GR)

(72) Inventor: Dimitrios Daios, Naoussa (GR)

( * ) Notice: Subject to any disclaimer, the term of this patent is extended or adjusted under 35 U.S.C. 154(b) by 43 days.

(21) Appl. No.: 16/076,744

(22) PCT Filed: Apr. 14, 2016

(86) PCT No.: PCT/GR2016/000016
§ 371 (c)(1),
(2) Date: Aug. 9, 2018

(87) PCT Pub. No.: WO2017/178846
PCT Pub. Date: Oct. 19, 2017

(65) Prior Publication Data
US 2019/0045728 A1 Feb. 14, 2019

(51) Int. Cl.
*A01G 25/02* (2006.01)
(52) U.S. Cl.
CPC .......... *A01G 25/023* (2013.01); *Y02A 40/237* (2018.01)
(58) Field of Classification Search
CPC .................................................. A01G 25/023
USPC ................................................. 239/542, 547
See application file for complete search history.

(56) References Cited

U.S. PATENT DOCUMENTS

| | | | |
|---|---|---|---|
| 4,600,152 A | 7/1986 | Samueli | |
| 4,824,025 A * | 4/1989 | Miller | A01G 25/023 |
| | | | 239/542 |
| 5,330,107 A * | 7/1994 | Karathanos | A01G 25/023 |
| | | | 239/542 |
| 6,817,548 B2 * | 11/2004 | Krauth | A01G 25/023 |
| | | | 239/542 |
| 6,945,476 B2 | 9/2005 | Giuffre | |
| 7,681,810 B2 | 3/2010 | Keren | |
| 9,795,092 B2 * | 10/2017 | Newbegin | A01G 25/00 |
| 2003/0226913 A1 * | 12/2003 | Brunnengraeber | A01G 25/023 |
| | | | 239/542 |
| 2007/0138323 A1 | 6/2007 | Lee | |

(Continued)

FOREIGN PATENT DOCUMENTS

| | | |
|---|---|---|
| CN | 102937188 A | 2/2013 |
| CN | 204560459 U | 8/2015 |

(Continued)

*Primary Examiner* — Steven J Ganey
(74) *Attorney, Agent, or Firm* — David S. Safran; Roberts Calderon Safran & Cole, P.C.

(57) ABSTRACT

A drip irrigation emitter with an anticlogging attribute. In the case of multi season crops, the lifespan of the drip irrigation pipe and the installation as a whole must follow the life span of the crop itself. Commonly, drip irrigation installations sometime in their life span get clogged and are thus rendered unusable due to the clogging occurring in the drip irrigation emitters themselves. Despite the use of filtering systems for the irrigation water, objects/dirt of miniscule cross-sectional areas are carried with the water that cannot be filtered at the filtering systems, thus entering the drip irrigation pipe and reaching the labyrinths of the individual emitters. This issue is catastrophic for the cultivation as irrigation of the crop is not performed uniformly leading to lower yield and income loss and possibly leading to the total loss of the plantation and the unavoidable replacement of the drip irrigation pipes.

7 Claims, 9 Drawing Sheets

(56) References Cited

U.S. PATENT DOCUMENTS

2014/0070029 A1\* 3/2014 Alkalay ............... A01G 25/023
 239/542
2016/0219803 A1 8/2016 Keren

FOREIGN PATENT DOCUMENTS

| CN | 105123431 A | 12/2015 |
|----|-------------|---------|
| WO | 93/02547 A1 | 2/1993 |
| WO | 02/085101 A1 | 10/2002 |
| WO | 2009/104183 A1 | 8/2009 |
| WO | 2015/044801 A1 | 4/2015 |

\* cited by examiner

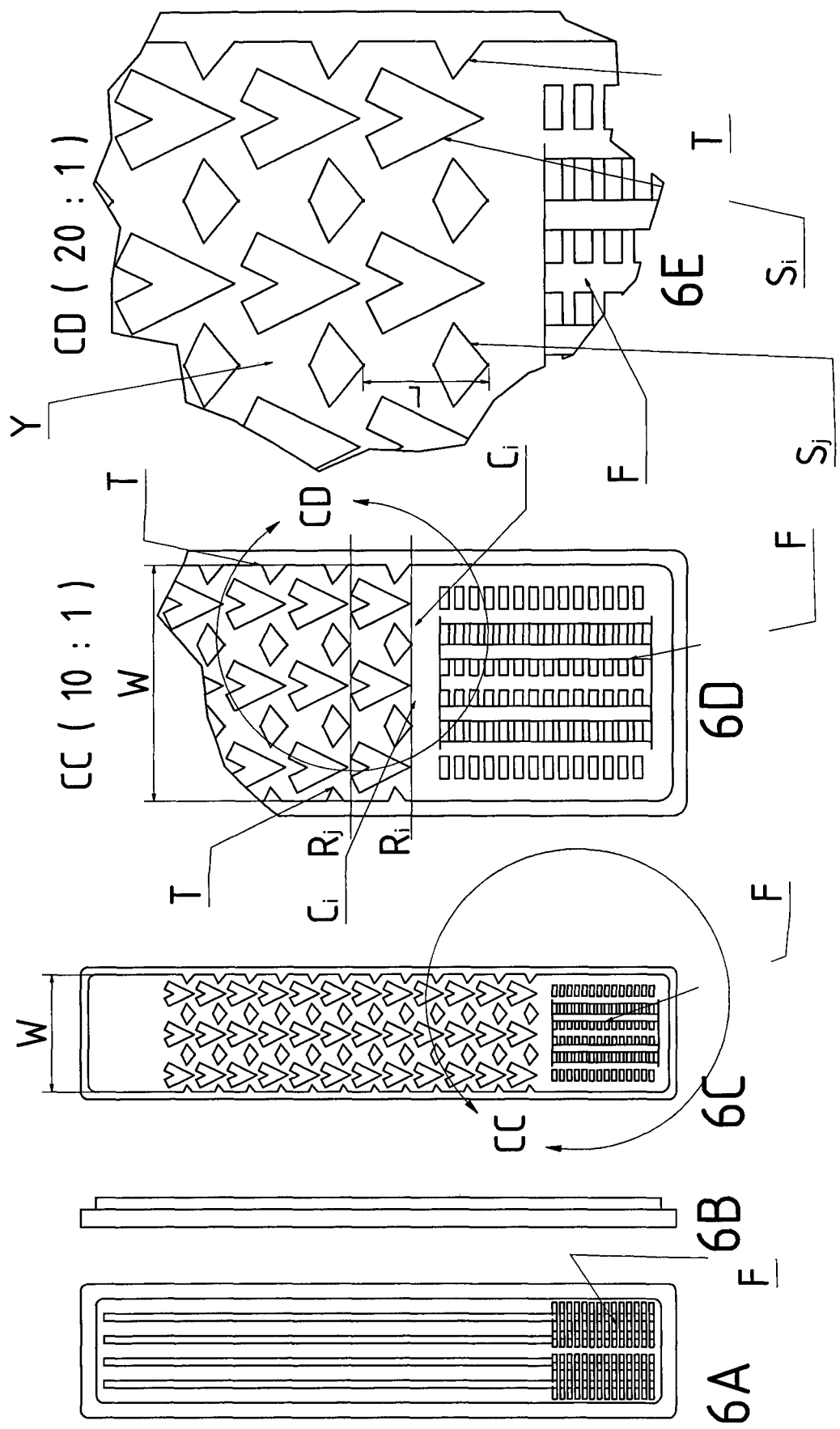

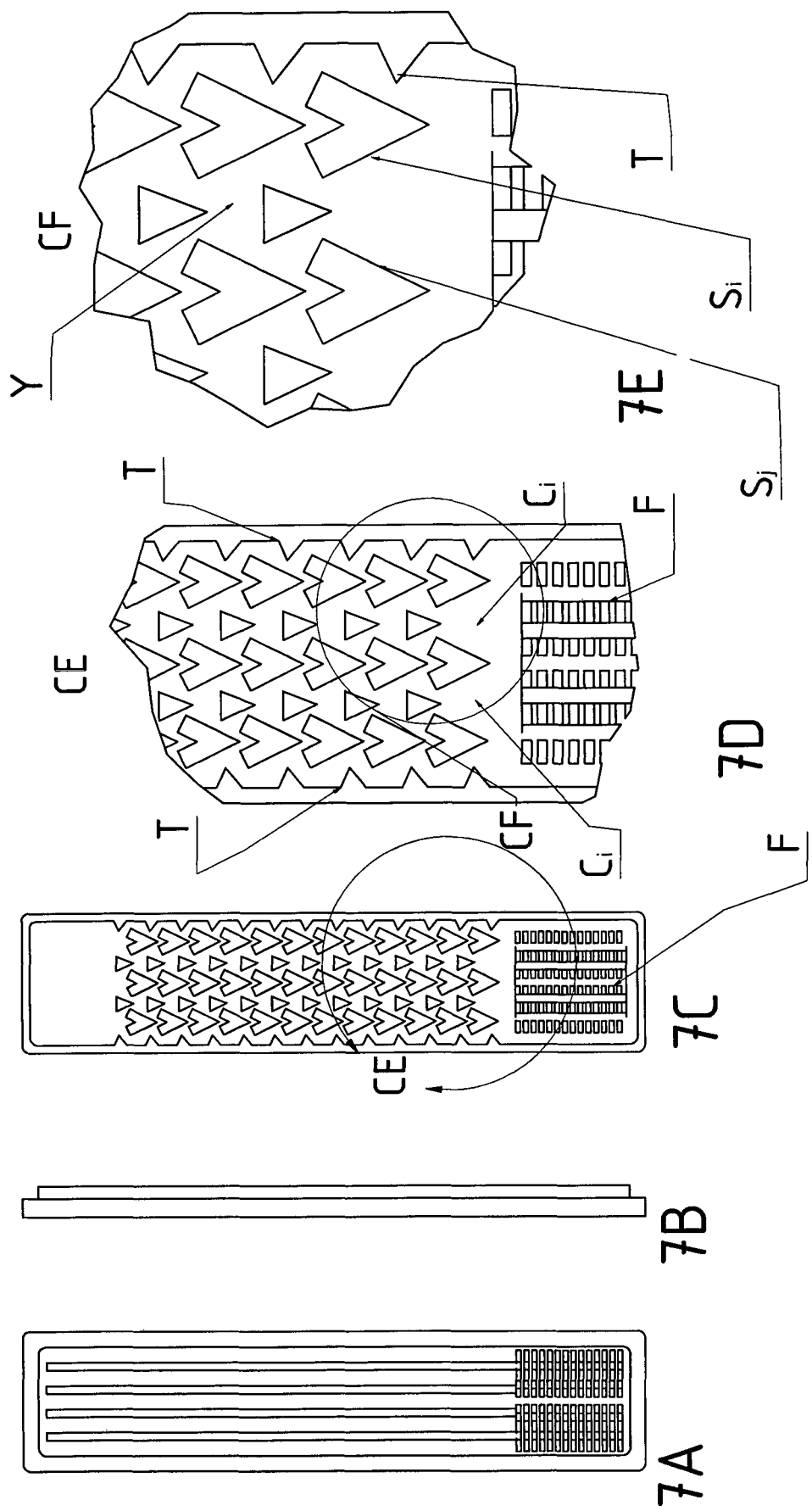

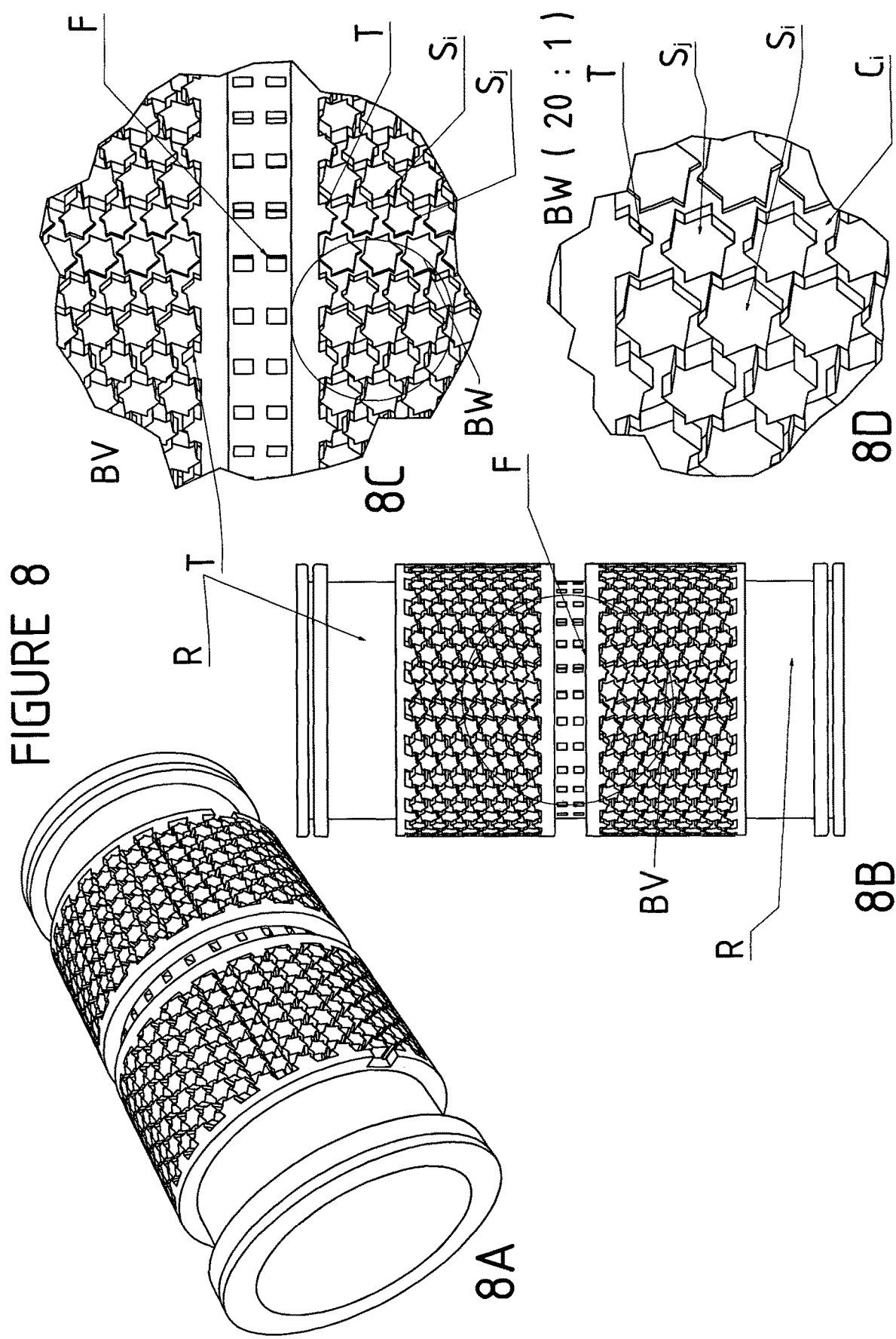

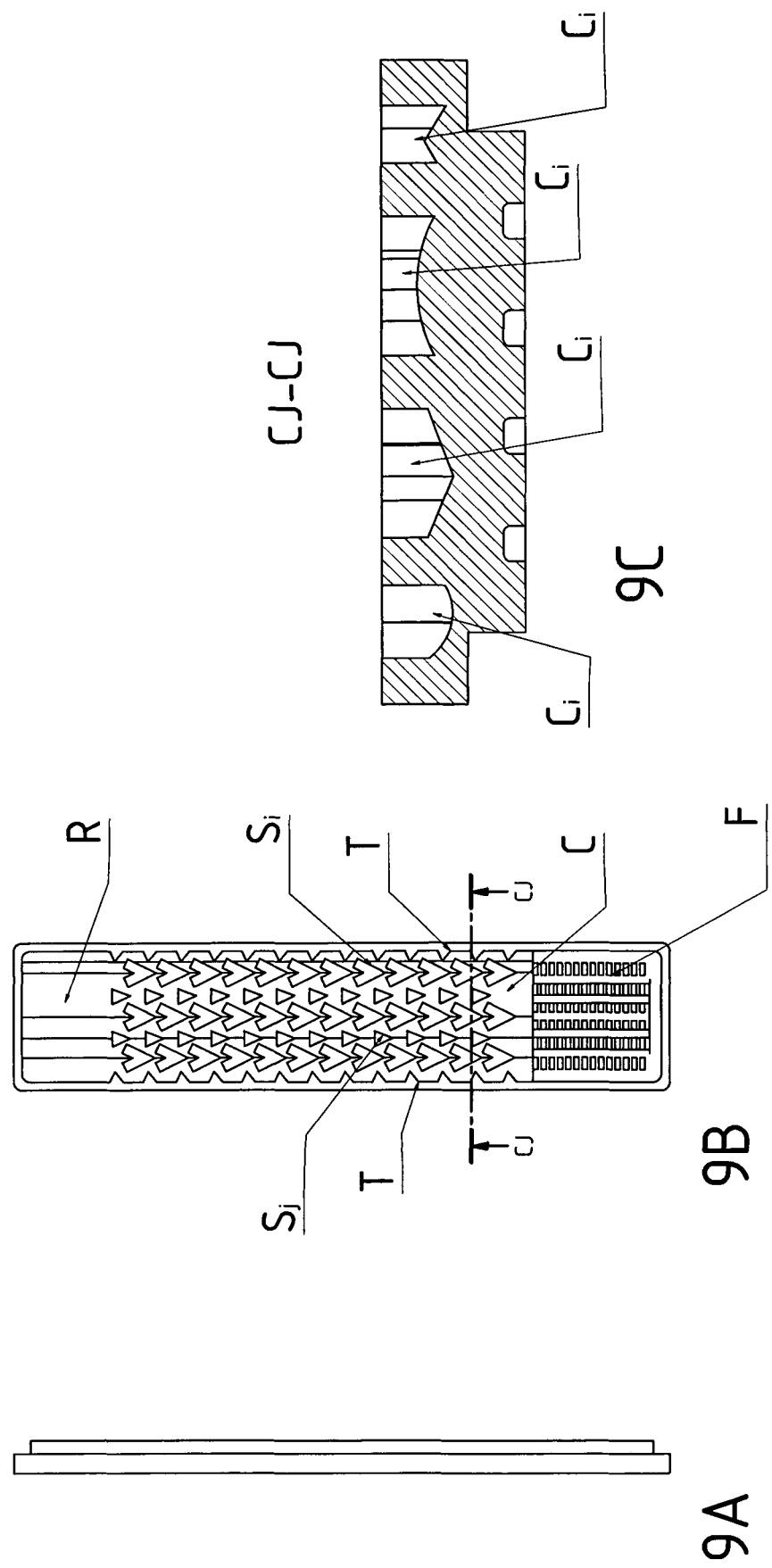

ANTI-CLOGGING DRIP IRRIGATION EMITTER

BACKGROUND OF THE INVENTION

Field of the Invention

The invention refers to a drip irrigation emitter with anticlogging attribute.

Description of Related Art

Drip irrigation installations may be employed for a single season or multi season crops depending on the cultivations they are meant to irrigate. In case of multi season crops, it is apparent that the lifespan of the drip irrigation pipe and the installation as a whole must follow the life span of the crop itself. Commonly drip irrigation installations sometime in their life span get clogged are thus rendered unusable due to said clogging occurring in the drip irrigation emitters themselves. Despite the use of filtering systems for the irrigation water, objects/dirt of miniscule cross-sectional areas are carried with the water that cannot be filtered at the filtering systems thus entering the drip irrigation pipe reaching the labyrinths of the individual emitters.

It is often the case as well that even the concentration of minerals and metals, mineral salts, or the fertigation that takes place through the irrigation pipes and emitters can lead to the formation of calculus having as a result the clogging of the emitters. This issue is catastrophic for the cultivation as the irrigation of the crop is not performed uniformly leading to yield and income loss and possibly leading to the total loss of the plantation and the unavoidable replacement of the drip irrigation pipes.

Conventional emitters FIG. 1 are produced employing injection molding and are commonly made out of polymeric materials and specifically polyolefins. They can be classed as external emitters or integral emitters. The latter could be flat, cylindrical, in the form of tapes or they can be embossed on the plastic pipe having the characteristic that they bear labyrinths FIG. 1A, B, C on their upper part through which water flows.

Emitters are placed/punched on the dripline in case of external emitters or are inserted during the production process in the pipe so that the labyrinths and the inner surface of the pipe form flow paths through which water passes.

Labyrinths are necessary for the pressure drop of the water that flows through them with initial pressure that can reach 4 bar and exits from them at practically zero pressure so that irrigation drop by drop can take place.

The pressure drop is achieved by energy dissipation due to the turbulent flow that is achieved through the flow paths of the water. Hence the shape of the labyrinths drastically affects the pressure drop as well as the sensitivity of the emitters to clogging. State of the art for emitters is the following: There is the entry point of the water through the filter F FIG. 1. The water is then led to the labyrinth whose entry has a cross section A and is defined by the cross section of the channel C. The labyrinth bears two distinct parts and more specifically the channel C and the teeth T that protrude from the walls of the channel. The size of the channel varies according to the desired water flow the shape, size or position of the teeth T as well as the frequency/period of the protruding teeth T varies according to the desired water flow and the manufacturer of emitters due to commercial mainly reasons. The teeth T force the water to change course locally increasing friction thus leading to turbulent flow. As the water flow passes from one tooth to the next change course constantly and remains turbulent having as a result the loss of energy until it reached the exit of the labyrinth where the continuous loss of energy has led to the desired drop of water pressure. However, the unidirectional flow has a mounting side effect as any foreign material that is carried into the water can clog the labyrinth at any point and any additional foreign material will be deposited on the exact same position where the first one has clogged the labyrinth hence rendering the fatal clogging of the emitter an unavoidable event.

Several solutions have been proposed for drip irrigation systems such as with International Patent Application Publications WO 93/02547 A1, WO 02/085101 A1 corresponding to U.S. Pat. No. 6,945,476, WO 2009/104183 corresponding to U.S. Pat. No. 7,681,810, and WO 2015/044801 A1 corresponding to U.S. Patent Application Publication 2016/219803, improving or enhancing the functionalities of emitters such as the water flow more turbulent, the pressure drop and the pressure compensation of the emitter flow however the issue of clogging remains an unsolved matter and for this reason several attempts to solve the problem have taken place mainly by adjusting the geometry, topology and the size of the water insertion filters on the emitters.

SUMMARY OF THE INVENTION

With the current invention, a new emitter type is suggested FIGS. 2 to 9 that bears a new labyrinth type. The new labyrinth is formed of three or more distinct parts and specifically A the channel the width FIG. 6, B the teeth that are located on the walls of the channel, and the separator or separators. In case there is one separator, as the water goes through the filter of the emitter, it reaches an entry point of the labyrinth the separator that is symmetrically positioned at the center of the channel so that the water flow is divided in two separate flows. Depending on the geometry of the separator, the flows are led in a specific direction and commonly towards the walls of the channel. The water flow then hits the teeth that protrude from the channel walls and force the water flow to change direction once again and meet at the back side of the separator where they are again united into a single flow which, however, due to the separation and the turbulence developed, will hit the tip of the next separator having less pressure in relation to the pressure at the tip of the previous separator. The united flow consequently hits the next separator that again leads to the symmetrical division of the water flow and directs the flows to the walls of the channel where again the next set of teeth protruding from the channel walls will redirect the flows to meet at the back of the current separator. This process leads to pressure loss, hence at slightly lower pressure in relation to the water pressure before the second water flow division. The process can be repeatedly continued until the water pressure nearly reaches zero and the water flow reaches the exit of the channel from which it is led through the relaxation baths and the respective hole/slit to the environment.

Hence, there are vaults formed in the labyrinth that are comprised by a the channel, B the separator and C the teeth that protrude from the channel walls towards the center of the channel. From the point at which the water flow meets the separator to the point where the divided flows are united again the pressure drop is minimal however the repeated process of the water passing from one vault to the next while being divided, redirected and united again under turbulent flow conditions lead consequently to the desired pressure drop at the exit of the channel hence to irrigation drop by drop.

When dirt, mineral metals or salts pass through the filter of the emitter and enter the channel they meet the separator that forces the foreign object to be led to either path 1 or 2 FIG. 2. For the foreign material to be trapped in any of the said paths, the projection of its cross section has to be greater than the cross section of the channel at that point so that it cannot continue to follow the water flow in the channel. Thus, if the foreign body gets stuck at any point of the path, for example, at path 1, then the water flow of path 2 FIG. 2 passes behind the separator and meets the foreign trapped body on its other side, where bearing in mind that in the same vault the pressure drop is minimal there are forces almost equal exerted on both sides of the foreign body. However, bearing in mind that the foreign body is dirt, minerals or indeed any body with irregular shape, there are different moments exerted on the two sides of the foreign body thereby forcing the foreign body to reposition itself several times in the channel thereby allowing it to obtain a favourable position so that it can follow the water flow to the next vault thus not being allowed to clog any position of the channel. The flow including any foreign body will hit the next separator that will again lead the foreign body to either path 1 or 2 FIG. 2. The same process takes place in the second vault and every one after that as the pressure in the vaults is practically almost constant however a pressure drop from one vault to the next It is apparent the channel can have any cross-sectional shape and the size of the cross section in conjunction with water pressure defines the volume of water that flows through the channel in any given time span, as well as the channel can be of any desired design on the emitter. It is also apparent that the invention applies to all emitter types such as cylindrical, flat, tape or embossed emitters as well as non-regulated or pressure regulated emitters and open type emitters those where the water flow channels are formed by the emitter and the inner surface of the pipe or closed type emitters those where the water flow channels are formed by the distinct parts of the emitter themselves A further advantage of the emitter is that the labyrinth formed of two or more paths that are bridged among them at the back of each separator. Hence even if the geometry of the foreign body is such that the counter current flow from path 2 cannot move the stuck foreign object from its trapped position at path 1, the water flow can continue unhindered to the next separator and from there to the next vault and the new paths that are anyhow bridged between them. Due to these bridges even at the extreme situation of having foreign objects with such a geometry that favors clogging, the water flow will not stop as it can flow to the next vault through alternative paths. Hence water flow is ensured even in extreme cases.

In addition, every channel could bear more than one separator and preferably up to 10 FIGS. 6, 7 and 8 so that the paths that are formed would be three in the case of two separators and respectively four in case of three separators or n+1 when the number of separators is n. In case of multiple separators, the labyrinths each are formed of the water flow channel, the separators and the teeth that protrude from the channel walls.

The channel cam have any geometry or topology FIG. 9 while the separators have to be preferably symmetrically positioned and in particular, in case of only one separator the first contact point of the water flow with the separator has to be exactly at the mid point between the channel walls, while in case of two separators S the first point of contact of the water flow with each separator has to be at one third of the distance from each channel's wall and respectively the space between the separators is at one third of the total distance of the channel. In the case of three separators respectively the first point of contact of the water flow with the separators will preferably be at one fourth of the total distance between the channel's walls and respectively the distance from the first separator to the next would again be one fourth of the total distance between the channel's walls. In case of n number of separators their position is preferably at 1/n+1 from every wall of the channel and equally so between one separator to the next.

In case of more than one separator, moving from the first row of separators to the next the water flow has to hit the next row of separators hence they have to be translated in relation to the first row and preferably at a half the distance between the ends of two separators of the first row. The next row follows the topology of the first row hence forming a repeating pattern so forth. The distance between the rows of separators could be equal or varying as the flow moves down the water flow channel.

The geometry of the separators in cross section could be circular, triangular, elliptical, trapezoid or formed in such a fashion that allows the positioning of the separators S in such a manner so that water flow paths are formed having the same geometry and size as this is particularly important for the formation of equal symmetrical water flows around the separators.

The size of the separators from one row to the next FIGS. 6, 7 and 8 could also vary in such a manner so that it allows their optimised position in the channel bearing in mind the symmetrical path formation for the water flows.

The invention can be applied to regular as well as pressure compensated emitters as it is applied on the labyrinths of the emitters whereas all other distinct elements filters, silicone membranes etc. are not affected and are know by the state of the art.

The invention is described in further detail below with reference to the accompanying drawings.

BRIEF DESCRIPTION OF THE DRAWINGS

FIG. 6 shows a flat emitter bearing a new type labyrinth with a plurality of separators in the water flow channel of different geometry.

FIG. 7 shows an emitter bearing a new type labyrinth a plurality of separators in the water flow channel of different geometry.

FIG. 8 shows a cylindrical emitter bearing separators of different size and geometry.

FIG. 9 shows channel cross-sections having different geometry in case that water flows in the labyrinths have to have different velocities.

DETAILED DESCRIPTION OF THE INVENTION

The new type labyrinth can be applied to closed type emitters the labyrinth is positioned internally in the emitter or open type emitters the labyrinth is formed between the emitter and the inner surface of the pipe, flat or cylindrical, in tape form or embossed on the pipe's inner surface.

According to the first embodiment of the invention the emitter is produced employing an injection molding process or 3D printing and bears filters F through which water is inserted in the channels of the emitter. The water is then led to the entry of the labyrinth that is formed by the water flow channel C, the teeth T that protrude from the walls of the channel walls and the separator S that is preferably placed symmetrically in elation to the walls of the channel C. The teeth T and separator S pattern is repeated so that vaults Y are formed in which the water pressure is nearly constant whereas moving from one vault Y to the next the water pressure drops so that when water exits to the relaxation bath the water pressure is practically zero. The emitter can be produced in cylindrical, flat form, as tape or embossed on the pipe's surface.

According to the second embodiment of the invention, the labyrinth is comprised of the water flow channel C, the teeth T that protrude from the walls of the channel and the separators $S_i$ & $S_j$ (FIGS. 6, 7 & 8), that are preferably placed at equal distances from the walls of the channel. The first row of separators leads the water flow to hit the next separator or separators S so that the next separators are shifted in relation to the first row of separators S and preferably at half the distance between the ends of every two separators of the preceding row. The next row follows the topology of the first row and so forth.

Figure 1:
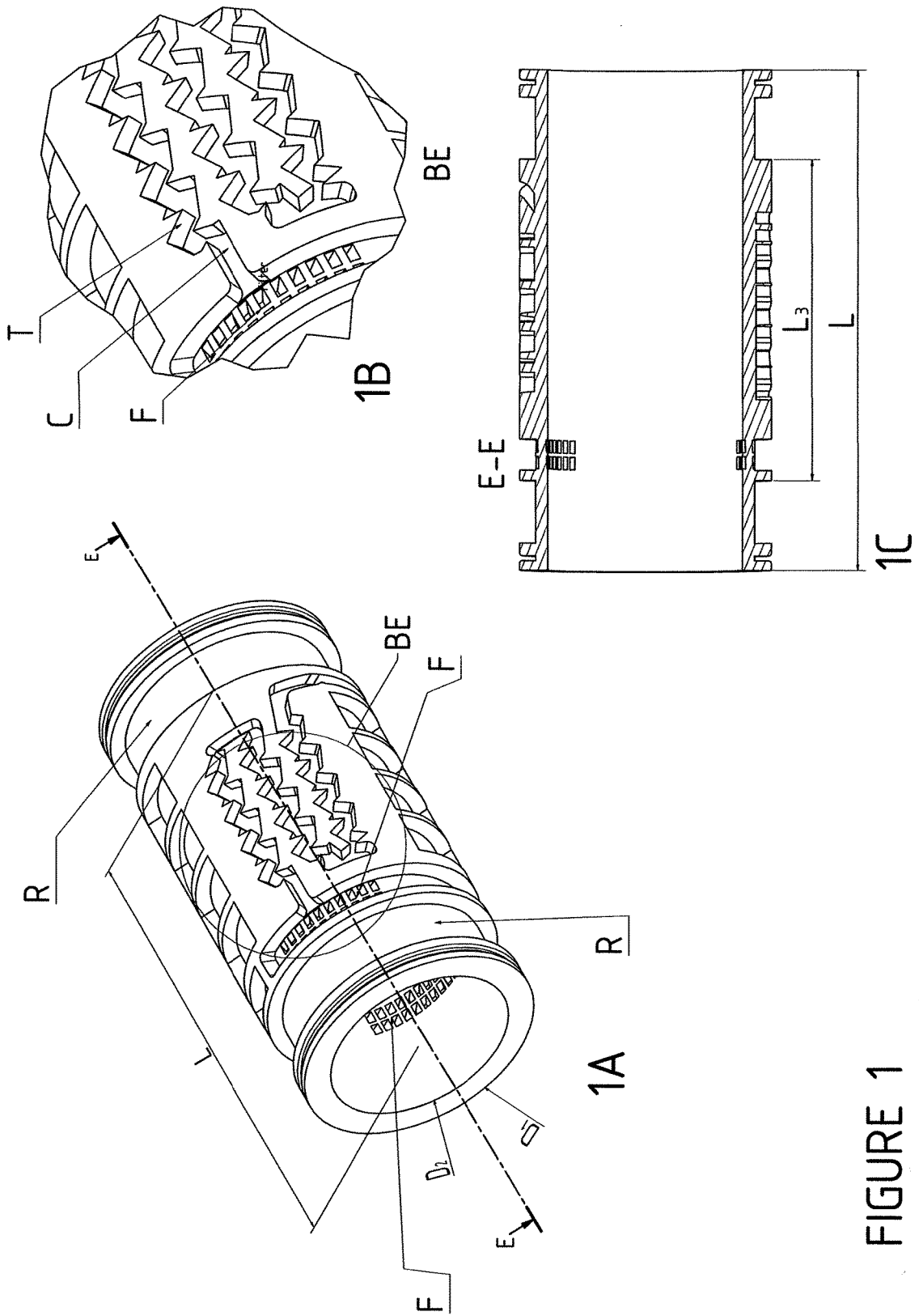
FIG. 1 shows a conventional cylindrical emitter where the following elements are depicted: a the water insertion filters, b labyrinth channel, c teeth that form the turbulent flow, and d relaxation baths.
Figure 2:
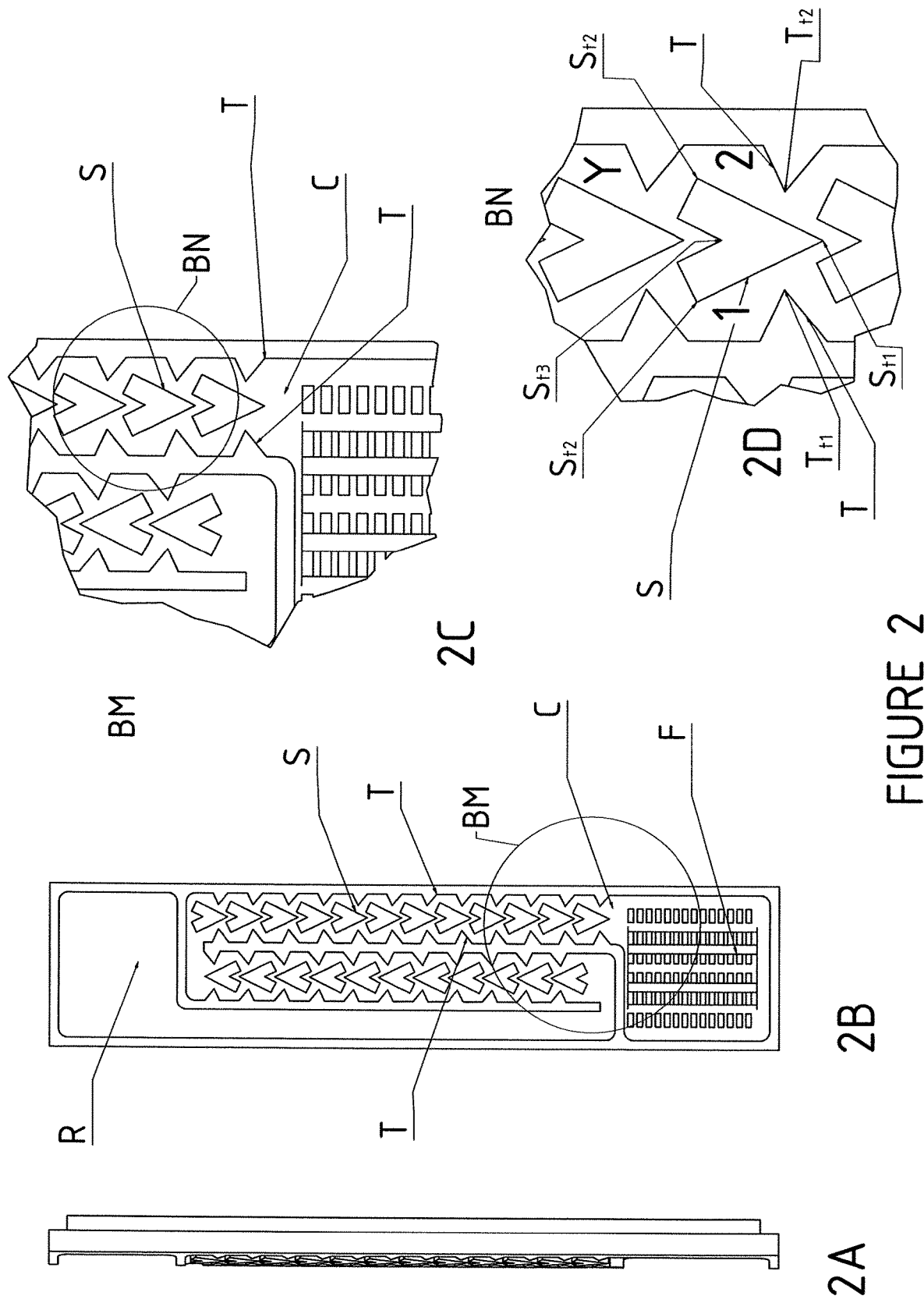
FIG. 2 shows a flat emitter bearing a new type of labyrinth having a water insertion filter, a labyrinth's channel, teeth that protrude from the walls of the channel, separators and d a water relaxation bath.
Figure 3:
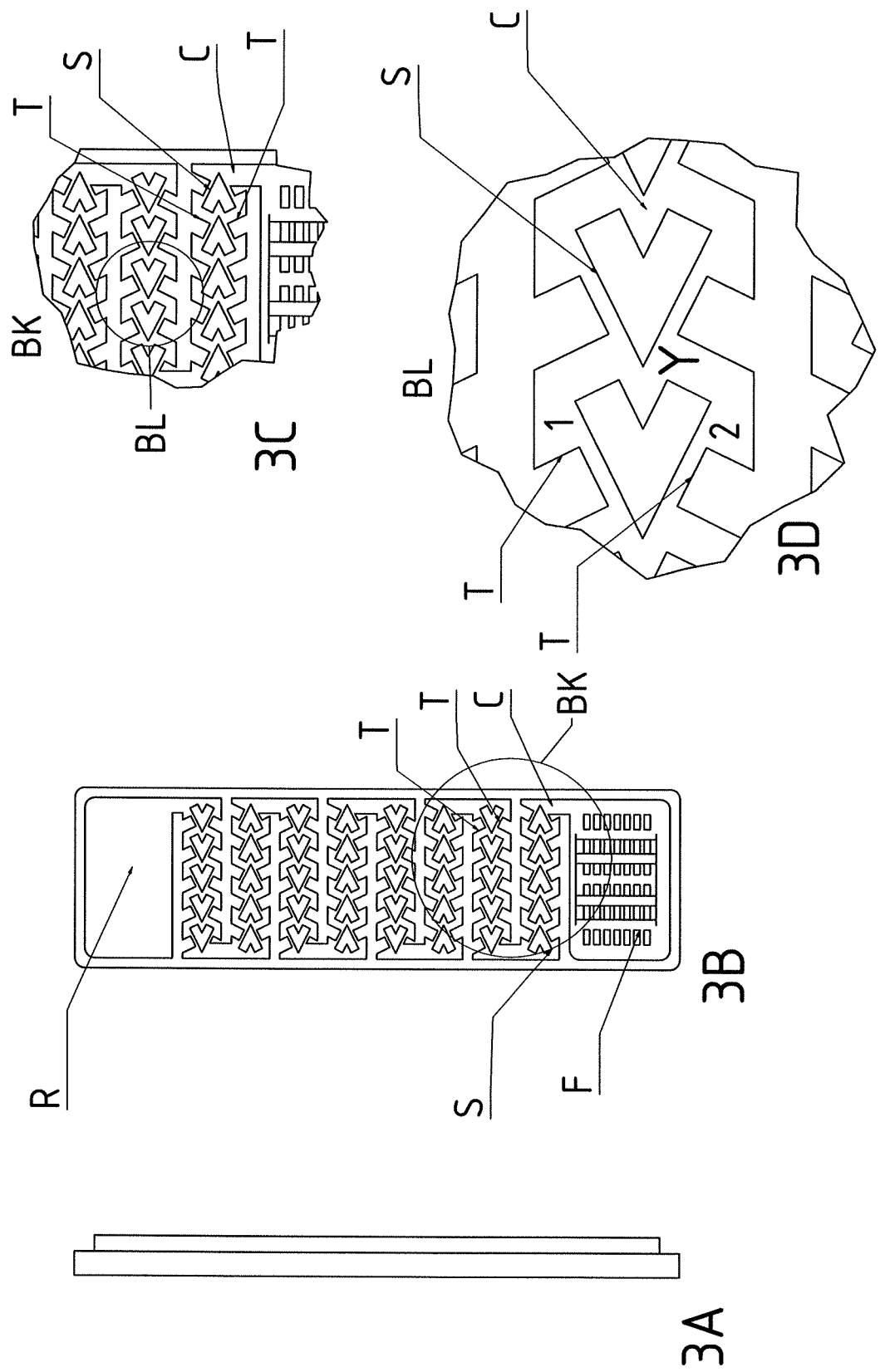
FIG. 3 shows a flat emitter bearing a new type labyrinth that is placed at 90° from the water insertion point.
Figure 4:
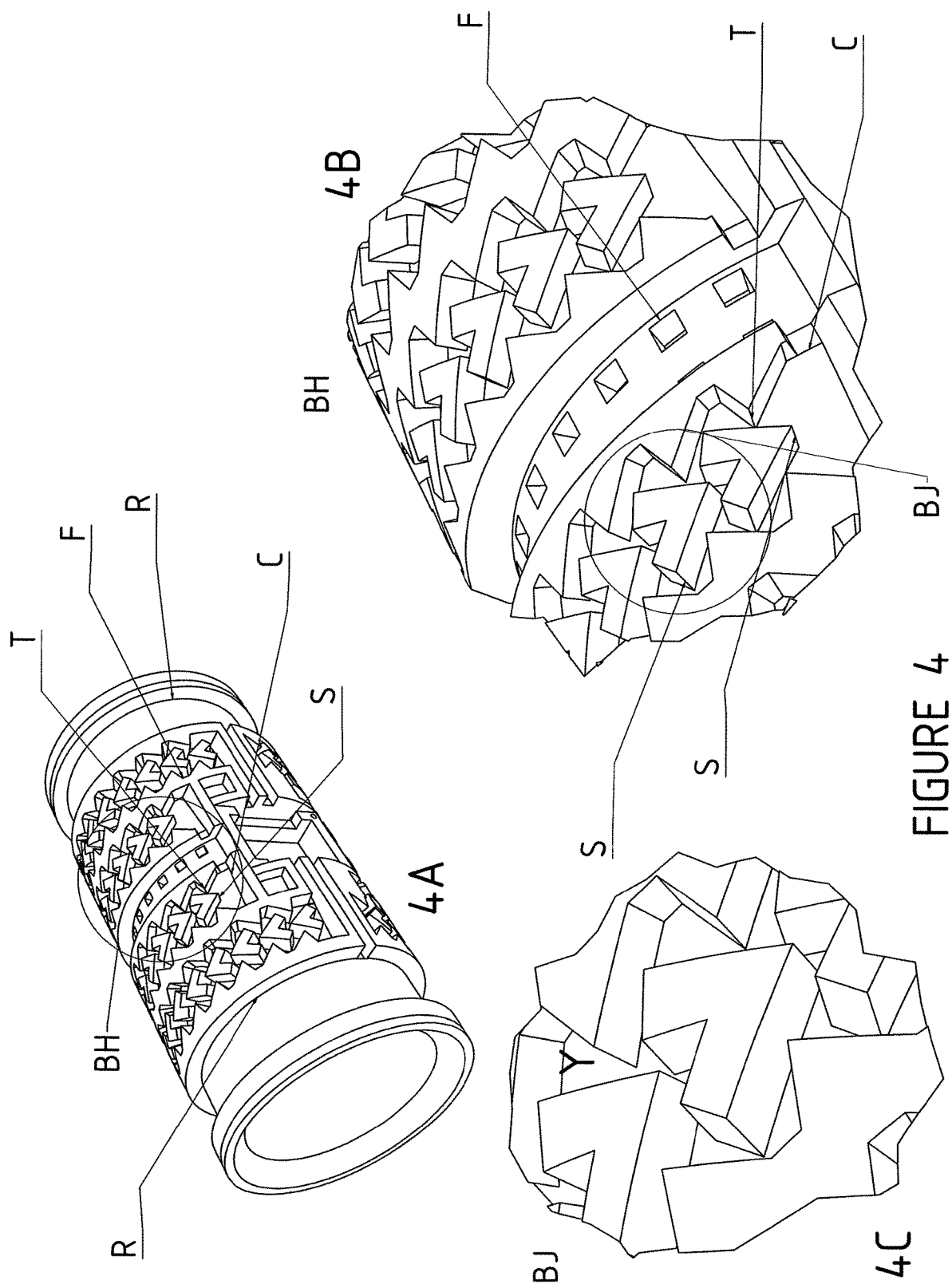
FIG. 4 shows a cylindrical emitter bearing a new type labyrinth.
Figure 5:
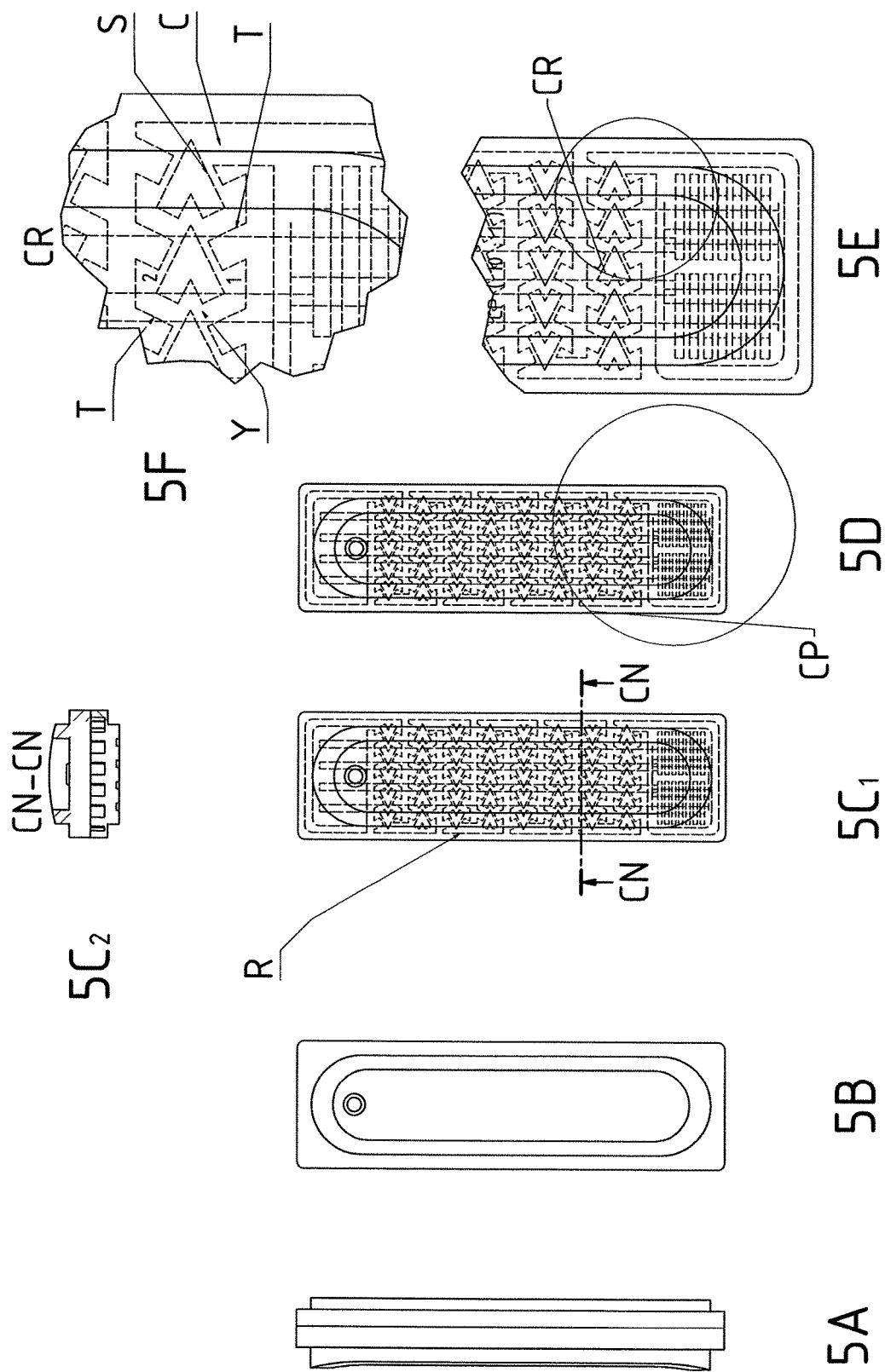
FIG. 5 shows a flat emitter bearing a new type labyrinth internally.

According to the third embodiment of the invention, the emitter is of the closed type (FIG. 5) and bears the labyrinth internally. In this case, the emitter can be flat or cylindrical.

According to the fourth embodiment of the invention, the labyrinth comprises the water flow channel C, the teeth T that protrude from the walls of the channel and the separators $S_i$ & $S_j$ (FIGS. 6, 7 & 8), bears all separators $S_i$ & $S_o$ or part of said separators of elastomeric materials so that their deformation under pressure can be facilitated in case a foreign body of unfavourable cross-sectional geometry or size clogs the flow path.

In any of the above cases, the emitter could be regular or pressure compensated, and in the latter case, it self regulates the water flow that exits to the relaxation bath and then through holes/slits to the environment, bearing a silicone membrane or other elastomeric material in selected places so that the flow is restricted according to the applied pressure.

What is claimed is:

1. An anti-clogging drip irrigation emitter, comprising:
a water flow channel,
a labyrinth that is formed by the water flow channel,
axial symmetric teeth that protrude from walls of the water flow channel,
a relaxation bath and
a plurality of consecutive separators extending from a water entry point to a water exit to the relaxation bath, the consecutive separators dividing an initial water flow into two flows that converge at a back of each individual separator, wherein each separator is placed so that a tip of the separator is located between tips of a pair of the axial symmetric teeth and according to an axis passing through a middle of the walls of the channel wall so that there are always two flow paths so that, if a foreign object clogs one of the flow paths, there will be an equal pressure exerted on the foreign object from an opposite side producing resulting moments on surfaces of the foreign object acting to force the foreign object to move through the distinct flow paths and gradually out of a pipe to which with which the emitter is associated to prevent clogging of the emitter.

2. The anti-clogging drip irrigation emitter according to claim 1, wherein the separators are of the same size and shape.

3. The anti-clogging drip irrigation emitter according to claim 1, wherein the separators are of different sizes and shapes.

4. The anti-clogging drip irrigation emitter according to claim 1, wherein the teeth are of the same size and shape.

5. The anti-clogging drip irrigation emitter according to claim 1, wherein the teeth are of different sizes and shapes.

6. The anti-clogging drip irrigation emitter according to claim 1, wherein at least some of the separators and teeth are made of an elastomeric material that allows sufficient deformation to facilitate preventing of clogging of the labyrinth by a foreign object by allowing the foreign object to move out of the drip irrigation emitter.

7. An anti-clogging drip irrigation emitter, comprising:
a relaxation bath,
a labyrinthine water flow channel extending from a water entry point to a water exit to the relaxation bath, each of opposed walls of the water flow channel having a series of spaced, axial symmetric teeth protruding therefrom, and
a series of consecutive separators extending from the water entry point to the water exit to the relaxation bath, the separators being positioned in the flow channel spaced from the protruding teeth, wherein each separator has a tip that is located between tips of two opposing teeth of the opposed walls, and wherein the separators divide an initial water flow into the water flow channel into two flows, a first of the two flows being between a first of the opposed walls and a first side of the separators and a second of the two flows being between a second of the opposed walls and a second side of the separators,
wherein the two flows converge between a front end and a back end of consecutive pairs of individual separators,
wherein the separators and opposed walls with the teeth are adapted to cause, if a foreign object clogs one of the two flow paths, a pressure to be exerted on the foreign object from an opposite side of the separators resulting in moments on surfaces of the foreign object acting to force the foreign object to move through the flow paths and gradually out of a pipe with which the emitter is associated to prevent clogging of the emitter.

* * * * *